(12) United States Patent
Fujisawa

(10) Patent No.: US 10,486,714 B2
(45) Date of Patent: Nov. 26, 2019

(54) VEHICLE OPERATION MANAGEMENT SYSTEM

(71) Applicant: VOLVO TRUCK CORPORATION, Gothenburg (SE)

(72) Inventor: Yukio Fujisawa, Saitama (JP)

(73) Assignee: VOLVO Truck Corporation, Gothenburg (SE)

( * ) Notice: Subject to any disclaimer, the term of this patent is extended or adjusted under 35 U.S.C. 154(b) by 0 days.

(21) Appl. No.: 14/653,396

(22) PCT Filed: Dec. 18, 2012

(86) PCT No.: PCT/JP2012/082737
§ 371 (c)(1),
(2) Date: Jun. 18, 2015

(87) PCT Pub. No.: WO2014/097381
PCT Pub. Date: Jun. 26, 2014

(65) Prior Publication Data
US 2015/0329120 A1     Nov. 19, 2015

(51) Int. Cl.
*B60W 50/08* (2012.01)
*G08G 1/00* (2006.01)
*G07C 5/00* (2006.01)

(52) U.S. Cl.
CPC ............. *B60W 50/08* (2013.01); *G07C 5/008* (2013.01); *G08G 1/20* (2013.01)

(58) Field of Classification Search
CPC ................................ B60W 50/08; G07C 5/008
See application file for complete search history.

(56) References Cited

U.S. PATENT DOCUMENTS

| | | | | |
|---|---|---|---|---|
| 4,602,247 A * | 7/1986 | Seko | ......................... | A61B 5/18 180/272 |
| 6,014,081 A * | 1/2000 | Kojima | .................... | G07C 5/04 340/439 |
| 7,117,075 B1 * | 10/2006 | Larschan | ............... | G06Q 10/06 701/29.6 |

(Continued)

FOREIGN PATENT DOCUMENTS

| | | |
|---|---|---|
| CN | 102394918 A | 3/2012 |
| JP | 2007102658 A | 4/2007 |

(Continued)

*Primary Examiner* — Jess Whittington
(74) *Attorney, Agent, or Firm* — Laurence A. Greenberg; Werner H. Stemer; Ralph E. Locher

(57) ABSTRACT

A vehicle operation management system for managing an operation of a vehicle includes: an on-vehicle device mounted on the vehicle, the on-vehicle device being configured to collect driving data of the vehicle and enable a driver to perform an operation for setting an activity state of the vehicle; a server installed outside the vehicle, the server being configured to communicate with the on-vehicle device and store the driving data of the vehicle; and a terminal device configured to communicate with the server, the terminal device being capable of bringing outside the vehicle. An operation signal output from the terminal device in response to an operation by the driver is transmitted to the server. The on-vehicle device is configured to set the activity state on the basis of the operation signal the server has received from the terminal device.

8 Claims, 5 Drawing Sheets

(56) References Cited

U.S. PATENT DOCUMENTS

| | | | |
|---|---|---|---|
| 7,715,961 B1* | 5/2010 | Kargupta | G06Q 10/08 |
| | | | 303/152 |
| 2004/0093264 A1* | 5/2004 | Shimizu | G07C 5/008 |
| | | | 705/13 |
| 2004/0243285 A1* | 12/2004 | Gounder | G07C 5/008 |
| | | | 701/1 |
| 2005/0283286 A1* | 12/2005 | Kanda | B60R 16/0232 |
| | | | 701/29.6 |
| 2007/0143002 A1* | 6/2007 | Crowell | G07C 5/004 |
| | | | 701/123 |
| 2008/0048844 A1* | 2/2008 | Watanabe | B60R 25/00 |
| | | | 340/425.5 |
| 2008/0287074 A1* | 11/2008 | Grunhold | H04M 1/6091 |
| | | | 455/90.2 |
| 2009/0299567 A1* | 12/2009 | Larschan | G06Q 10/06 |
| | | | 701/29.2 |
| 2009/0326991 A1* | 12/2009 | Wei | G06Q 10/02 |
| | | | 705/5 |
| 2011/0077028 A1* | 3/2011 | Wilkes, III | B60W 50/14 |
| | | | 455/456.3 |
| 2013/0211623 A1* | 8/2013 | Thompson | G07C 5/008 |
| | | | 701/2 |
| 2013/0297456 A1* | 11/2013 | Annan | G06Q 30/06 |
| | | | 705/26.81 |
| 2013/0304276 A1* | 11/2013 | Flies | G06F 17/00 |
| | | | 701/1 |
| 2016/0129882 A1 | 5/2016 | Thompson et al. | |
| 2016/0247153 A1* | 8/2016 | Lesesky | G06Q 20/405 |

FOREIGN PATENT DOCUMENTS

| | | |
|---|---|---|
| JP | 2008108235 A | 5/2008 |
| JP | 2010038785 A | 2/2010 |
| JP | 2011169632 A | 9/2011 |
| JP | 2012008697 A | 1/2012 |
| JP | 2012208722 A | 10/2012 |
| JP | 2013149062 A | 8/2013 |
| WO | 2011147893 A1 | 12/2011 |

* cited by examiner

VEHICLE OPERATION MANAGEMENT SYSTEM

TECHNICAL FIELD

The present invention relates to a vehicle operation management system for managing the operation of a vehicle.

BACKGROUND ART

In order to manage the operation of a vehicle, a vehicle operation management system for collecting driving data, such as a vehicle speed, in chronological order has been conventionally used. JP 2008-108235A discloses a vehicle operation management system including on-vehicle devices and a server, wherein the on-vehicle devices are mounted on a plurality of vehicles, and the server can record driving data of different vehicles received via communication with the on-vehicle devices of the plurality of vehicles. In this vehicle operation management system, driving data of a vehicle is collected in a time period from when a driver performs a start operation to when the driver performs a shutdown operation.

SUMMARY OF INVENTION

However, in the vehicle operation management system of JP 2008-108235A, the setting of an activity state, such as the start operation and the shutdown operation, is configured by a driver operating a button of an on-vehicle device. Therefore, if the driver forgets to operate the button, there is a possibility that accurate driving data cannot be collected.

The present invention has been made in view of the above problem, and aims to prevent an inadvertent failure to set an activity state of a vehicle.

According to one aspect of the present invention, a vehicle operation management system for managing an operation of a vehicle includes an on-vehicle device mounted on the vehicle, the on-vehicle device being configured to collect driving data of the vehicle and enable a driver to perform an operation for setting an activity state of the vehicle, a server installed outside the vehicle, the server being configured to communicate with the on-vehicle device and store the driving data of the vehicle and a terminal device configured to communicate with the server, the terminal device being capable of bringing outside the vehicle. An operation signal output from the terminal device in response to an operation by the driver is transmitted to the server. The on-vehicle device is configured to set the activity state on the basis of the operation signal the server has received from the terminal device.

The details as well as other features and advantages of this invention are set forth in the remainder of the specification and are shown in the accompanying drawings.

DESCRIPTION OF EMBODIMENTS

The following describes a vehicle operation management system 100 according to an embodiment of the present invention with reference to the drawings.

First, a configuration of the vehicle operation management system 100 will be described with reference to FIGS. 1 and 2.

Figure 1:
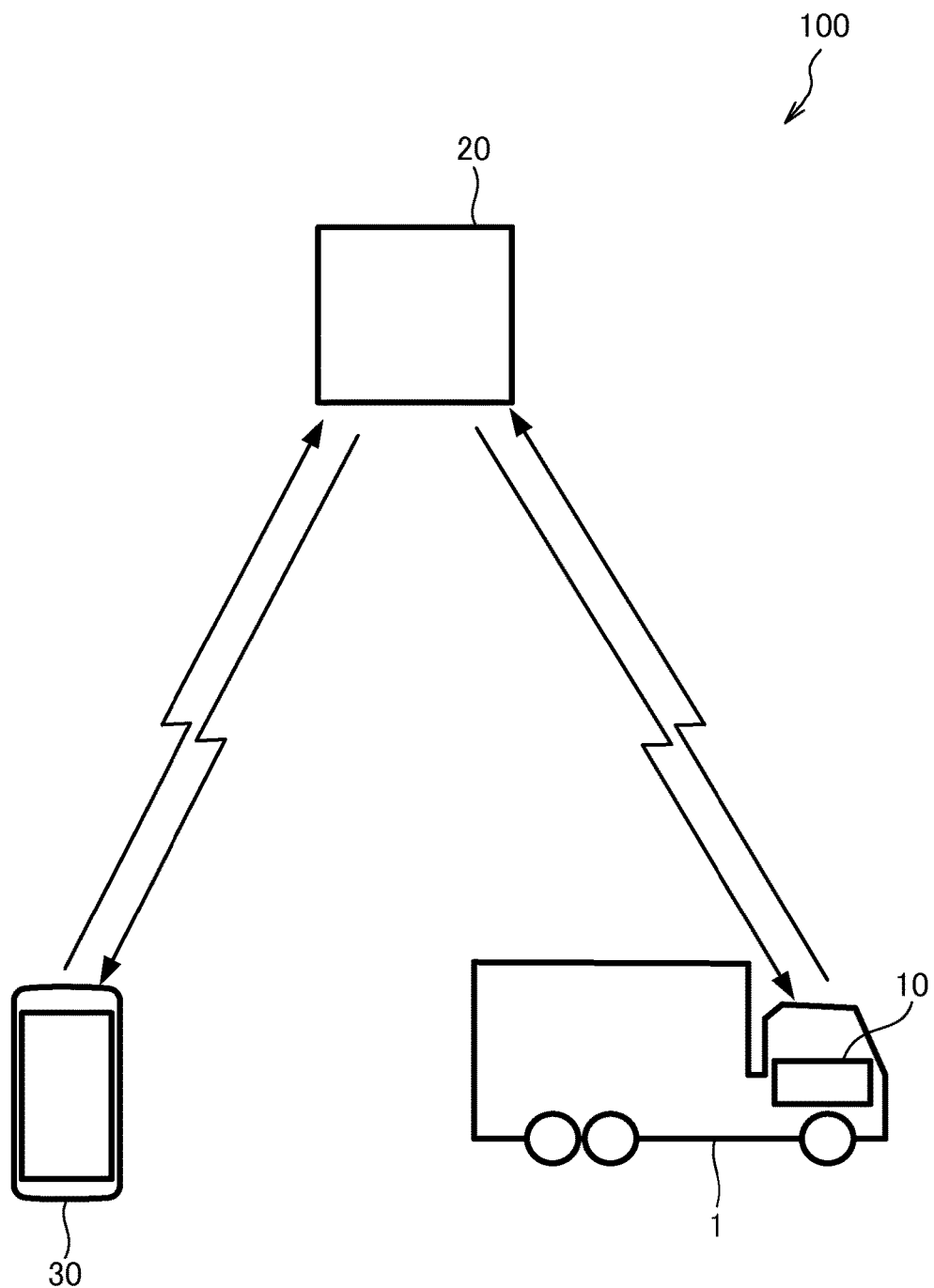
FIG. 1 shows a configuration of a vehicle operation management system according to an embodiment of the present invention.

As shown in FIG. 1, the vehicle operation management system 100 includes an on-vehicle device 10, a server 20, and a terminal device 30. The on-vehicle device 10 is mounted on a vehicle 1 and collects driving data of the vehicle 1. The server 20 is installed outside the vehicle 1 and can store the driving data of the vehicle 1 via communication with the on-vehicle device 10. The terminal device 30 can communicate with the server 20 and can be brought outside the vehicle 1. The vehicle operation management system 100 is a so-called telematics system that manages the operation of the vehicle 1 using communication with the on-vehicle device 10 and the server 20.

Figure 2:
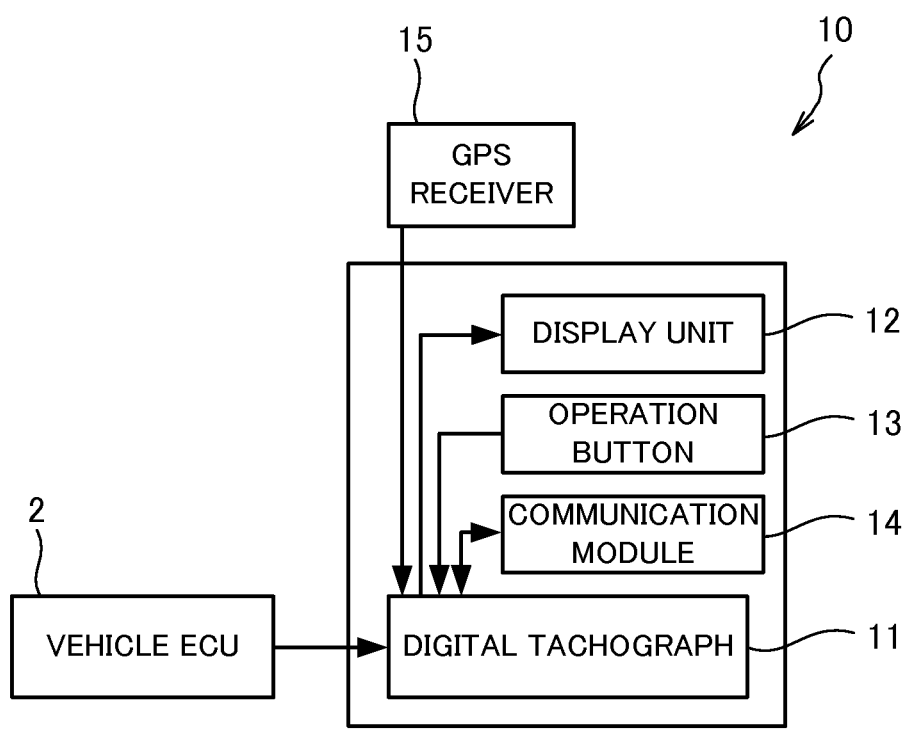
FIG. 2 is a block diagram of an on-vehicle device in the vehicle operation management system.

As shown in FIG. 2, the on-vehicle device 10 includes a digital tachograph 11, a display unit 12, an operation button 13, a communication module 14, and a GPS receiver 15. The digital tachograph 11 collects driving data, such as a vehicle speed and an engine speed of the vehicle 1, in chronological order. The display unit 12 can display information of the digital tachograph 11. The operation button 13 can be operated by a driver. The communication module 14 can communicate with the server 20. The GPS receiver 15 obtains location information of the vehicle 1 from a global positioning system (GPS) satellite.

The on-vehicle device 10 can set an activity state of the vehicle 1 on the basis of an operation signal that the server 20 receives from the terminal device 30. An activity state denotes a state of a current activity which the driver has the vehicle 1 engaged in. Examples of the activity state include a start state in which the driver starts the operation of the vehicle 1, a shutdown state in which the driver has ceased the operation of the vehicle 1, and a rest state in which the driver is taking a rest.

The digital tachograph 11 is a vehicle operation recording instrument that collects driving data, such as a vehicle speed and an engine speed of the vehicle 1, obtained from an electronic control unit (ECU) 2 of the vehicle 1, and records the collected driving data as digital data into an internal memory. The digital tachograph 11 records location information of the vehicle 1 obtained by the GPS receiver 15 into the internal memory, together with the driving data of the vehicle 1.

The display unit 12 displays information related to the setting of the digital tachograph 11 and information related to the operation of the vehicle 1, such as a time period of continuous vehicle operation, in such a manner that these pieces of information are visible to the driver.

The operation button 13 is provided in a manner operable by the driver. Providing the on-vehicle device 10 with the operation button 13 enables the driver to perform an operation for setting an activity state of the vehicle 1.

When starting the operation of the vehicle 1, the driver first boards the vehicle 1, and then performs a start operation by operating the operation button 13 of the on-vehicle device 10. Specifically, the driver inputs his/her identification data (ID) by operating the operation button 13. Once the start operation has been performed, the activity state is set to the start state, and the on-vehicle device 10 is placed in a state where it can start the collection of driving data of the vehicle 1. When ceasing the operation of the vehicle 1, the driver performs a shutdown operation by operating the operation button 13 of the on-vehicle device 10 before getting off the vehicle 1. Once the shutdown operation has been performed, the activity state is set to the shutdown state, and the on-vehicle device 10 ceases the collection of driving data of the vehicle 1.

As indicated above, the setting of the activity state, such as the start operation and the shutdown operation, is typically configured by the driver operating the operation button 13 of the on-vehicle device 10. Therefore, if the driver forgets to operate the operation button 13, there is a possibility that accurate driving data cannot be collected due to the inability to identify the start time and the end time of the collection of driving data. In view of this, the vehicle operation management system 100 enables the setting of the activity state of the vehicle 1 through a remote operation using the terminal device 30. This remote operation using the terminal device 30 will be described later in detail with reference to FIGS. 3 to 5.

The communication module 14 is a mobile telephone module. The communication module 14 transmits and receives data to and from the server 20 using radio waves for mobile telephones. Rather than being a mobile telephone module, the communication module 14 may be, for example, a personal handy-phone system (PHS) module or a wireless local area network (LAN) module.

The communication module 14 transmits fuel consumption information of the vehicle 1 to the server 20, in addition to the driving data of the vehicle 1 collected by the digital tachograph 11. The communication module 14 can also receive, for example, a program for updating software of the on-vehicle device 10 from the server 20.

The GPS receiver 15 transmits location information of the vehicle 1 obtained from the GPS satellite to the digital tachograph 11. A GPS antenna of a navigation system installed in the vehicle 1 may double as the GPS receiver 15.

The server 20 can perform wireless communication with the on-vehicle device 10. An operation signal that is output from the terminal device 30 in response to an operation by the driver is transmitted to the server 20. When the activity state of the vehicle 1 is set to the shutdown state, the driving data and the fuel consumption information of the vehicle 1 recorded in the on-vehicle device 10 are transmitted to the server 20. The server 20 stores the driving data and the fuel consumption information of the vehicle 1 received from the on-vehicle device 10.

The server 20 stores driving data, fuel consumption information, and the like of a plurality of vehicles 1. Therefore, the server 20 can generate comparative data showing comparison with other vehicles 1, such as a fuel consumption rank based on fuel consumption information of the plurality of vehicles 1 and an eco-friendly score for evaluating the level of eco-friendly driving.

The terminal device 30 is an information communication terminal, such as a mobile telephone, that can be carried around by the driver. The terminal device 30 can perform wireless communication with the server 20. In response to an operation by the driver, the terminal device 30 outputs an operation signal corresponding to the operation to the server 20. In place of an information communication terminal, a personal computer installed in an office may be used as the terminal device 30.

Figure 3:
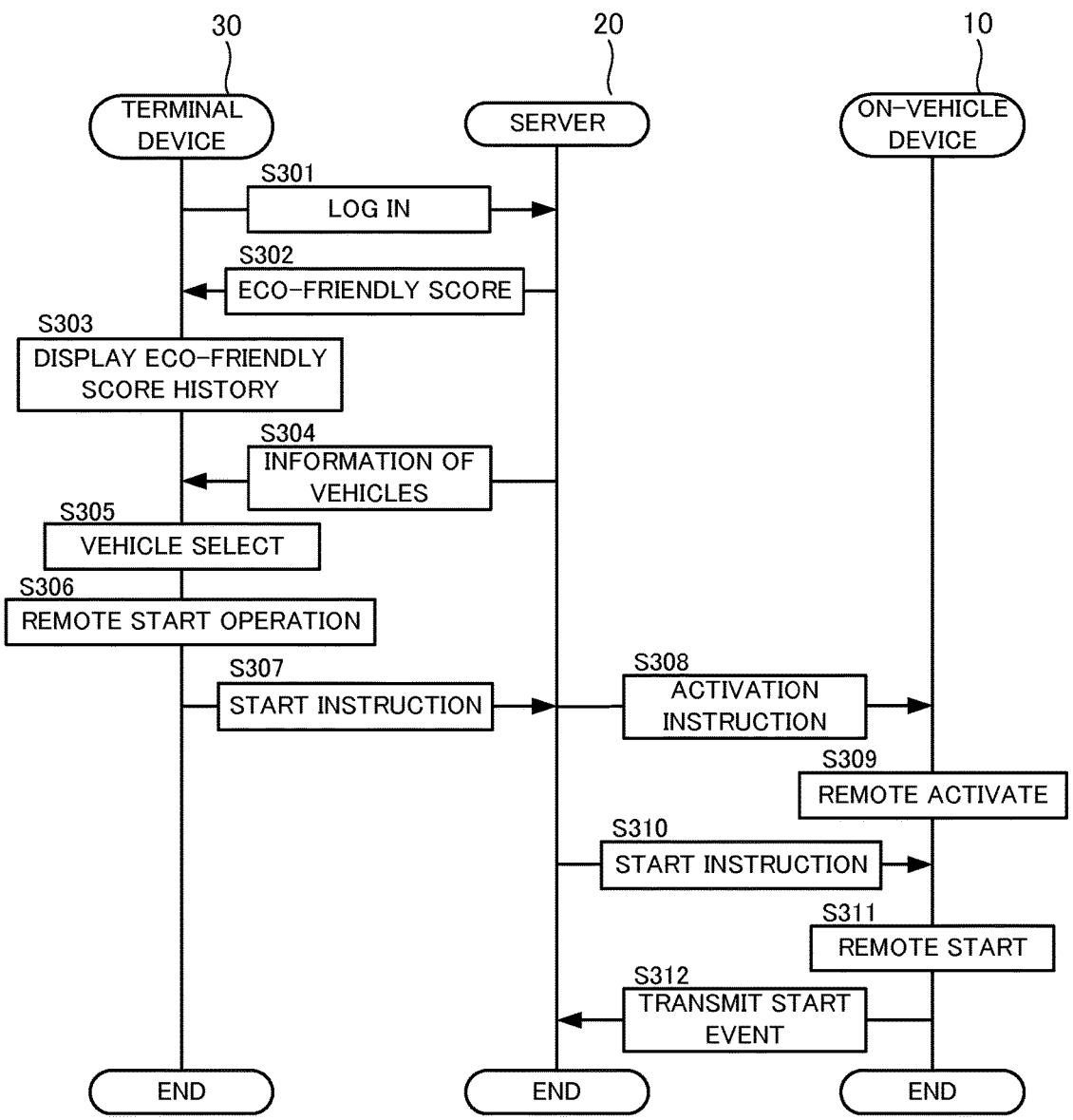
FIG. 3 is a sequence diagram of a start operation in the vehicle operation management system.
Figure 4:
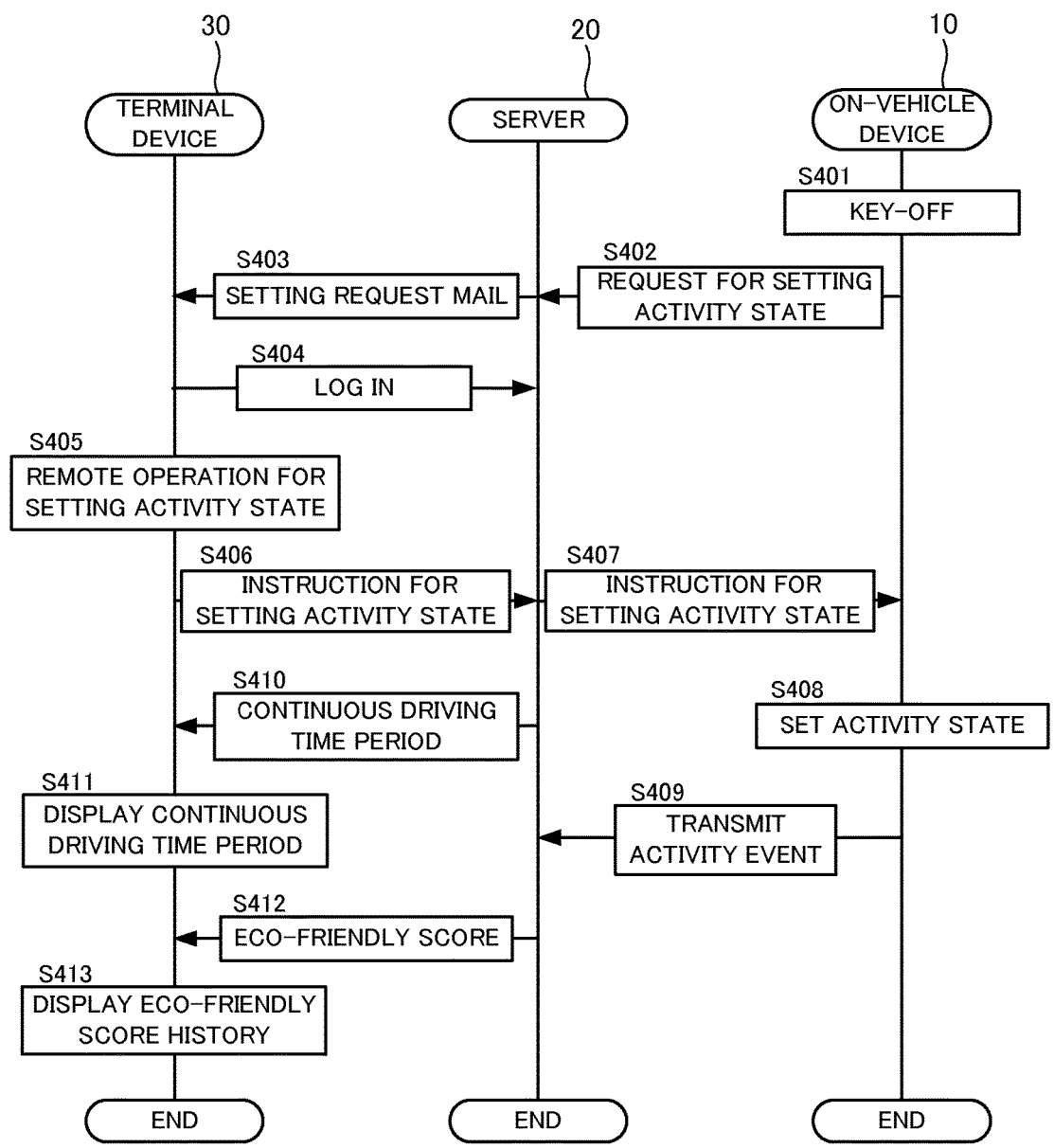
FIG. 4 is a sequence diagram of a rest operation in the vehicle operation management system.
Figure 5:
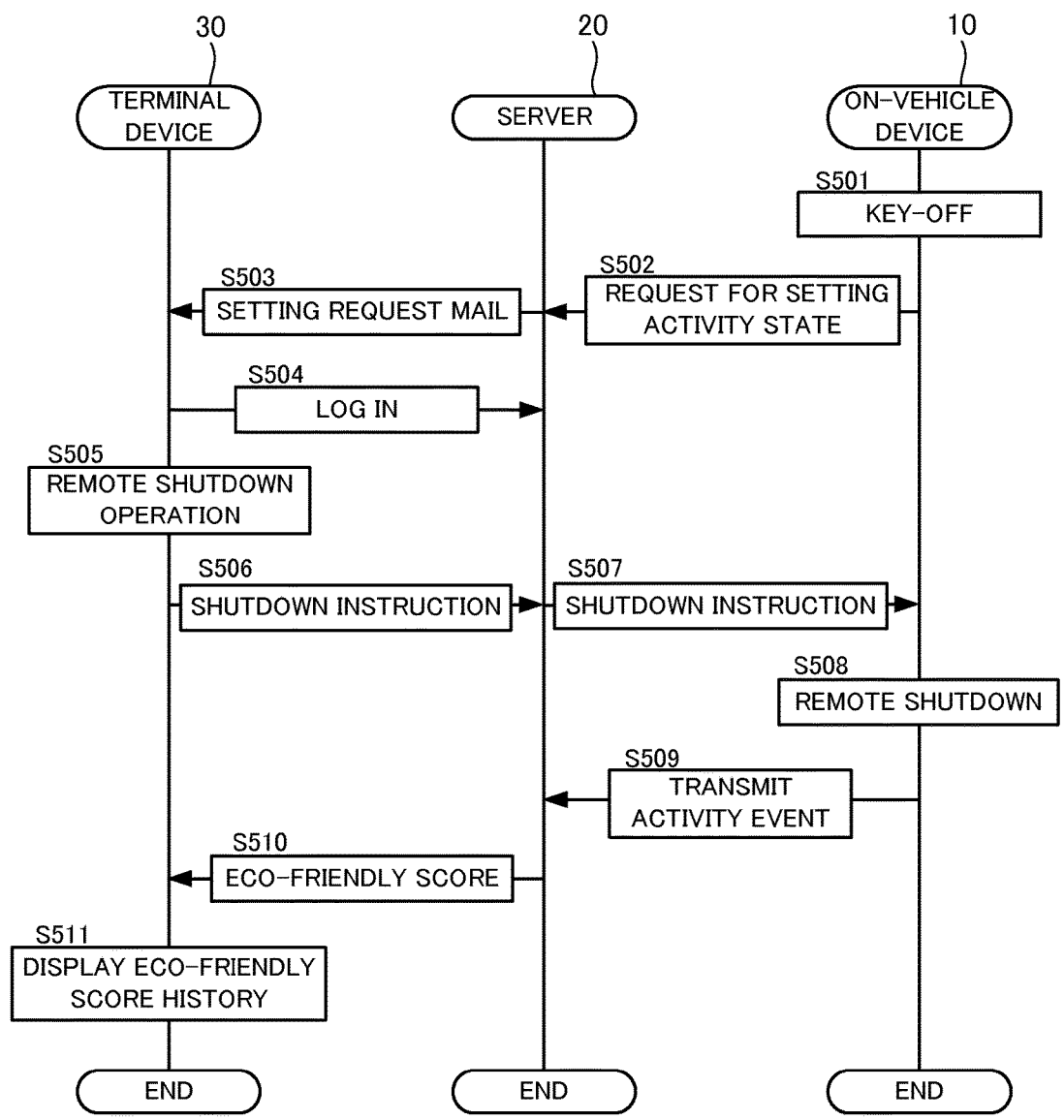
FIG. 5 is a sequence diagram of a shutdown operation in the vehicle operation management system.

The following describes setting of the activity state of the vehicle 1 through a remote operation using the terminal device 30 with reference to FIGS. 3 to 5.

First, the start operation for setting the activity state of the vehicle 1 to the start state will be described with reference to FIG. 3.

The processing in FIG. 3 is executed by the driver operating the terminal device 30 before boarding the vehicle 1, e.g., when a roll call is performed at the start of work in the office.

First, in step 301, the driver logs into the server 20 by operating the terminal device 30. At this time, the driver inputs an ID and password to the terminal device 30 and transmits them to the server 20. The server 20 identifies the driver from the ID and password received from the terminal device 30.

In step 302, the server 20 transmits, to the terminal device 30, a fuel consumption rank, an eco-friendly score, and the like based on fuel consumption information pertaining to a previous vehicle operation by the driver. In step 303, the terminal device 30 displays the received fuel consumption rank, eco-friendly score, and the like. In this way, the driver can acknowledge the evaluation of his/her driving in the previous vehicle operation. At this time, the terminal device 30 displays the name of the driver based on the input ID. Therefore, the driver can be prevented from inputting a wrong ID.

In step 304, on the basis of data of the driver identified from the ID and password, the server 20 transmits, to the terminal device 30, information of vehicles owned by the office to which the driver belongs. The terminal device 30 displays a list of vehicles that the driver can board.

In step 305, the driver selects a vehicle 1 that he/she will board that day from the list of vehicles. Then, in step 306, the driver performs a remote start operation by inputting, to the terminal device 30, the ID of the driver and a vehicle number of the vehicle 1 that the driver will board.

In step 307, the terminal device 30 transmits the ID of the driver and the vehicle number of the vehicle 1 that the driver will board, which were input in step 306, to the server 20. Upon receiving the remote start operation through the terminal device 30, the server 20 transmits an activation instruction to the on-vehicle device 10 in step 308. Consequently, in step 309, the on-vehicle device 10 is remotely activated.

The server 20 waits until the on-vehicle device 10 is actually activated after the start of the remote activation of the on-vehicle device 10. Thereafter, the server 20 transmits the ID of the driver to the vehicle 1 in step 310. Consequently, in step 311, the on-vehicle device 10 is remotely started. In step 312, the on-vehicle device 10 transmits a start event associated with the remote start to the server 20. Therefore, a start operation, which is traditionally performed after the driver boards the vehicle 1, can be performed before the driver boards the vehicle 1 through the driver's operation of the terminal device 30.

In this way, the terminal device 30 can perform a start operation for starting the operation of the vehicle 1. When the terminal device 30 has performed the start operation, the activity state is set to the start state, and the on-vehicle device 10 is placed in a state where it can start the collection of driving data of the vehicle 1.

As described above, in the vehicle operation management system 100, the terminal device 30 that can be brought outside the vehicle 1 can set the activity state of the vehicle 1 to the start state. Therefore, the driver can set the activity state of the vehicle 1 to the start state using the terminal device 30 before boarding the vehicle 1. In this way, the activity state can be set to the start state without the driver boarding the vehicle 1, and hence an inadvertent failure to set the activity state of the vehicle 1 can be prevented.

Furthermore, as the start operation can be completed before the driver boards the vehicle 1, the driver can start the vehicle operation immediately after boarding the vehicle 1. Accordingly, a time period from when the driver boards the vehicle 1 to when the driver starts the vehicle operation can be reduced.

Next, a rest operation for setting the activity state of the vehicle 1 to the rest state will be described with reference to FIG. 4.

First, in step 401, the driver turns off an ignition switch of the vehicle 1. The processing in FIG. 4 is executed when the driver turns off the ignition switch with the activity state being left unchanged from the start state. That is to say, the processing of FIG. 4 is not executed when the driver turns off the ignition switch after setting the activity state to the rest state by operating the operation button 13 of the on-vehicle device 10.

In step 402, the on-vehicle device 10 transmits, to the server 20, a request suggesting the setting of the activity state. Then, in step 403, the server 20 issues to the terminal device 30 a notification suggesting a change in the setting of the activity state. Specifically, the server 20 transmits, to the terminal device 30, an electronic mail suggesting a change in the setting of the activity state.

In this way, when the ignition switch of the vehicle 1 is turned off without performing an operation for changing the setting of the activity state, the on-vehicle device 10 issues a notification suggesting a change in the setting of the activity state to the terminal device 30 via the server 20.

In step 404, the driver checks the mail that was transmitted from the server 20 in step 403, and logs into the server 20 by operating the terminal device 30. Then, in step 405, the driver performs a remote operation for setting the activity state by operating the terminal device 30. Specifically, when the driver is going to take a rest, the driver performs an operation for setting the activity state to the rest state.

In step 406, the terminal device 30 transmits, to the server 20, an instruction for setting the activity state to the rest state. Then, in step 407, the server 20 transmits, to the on-vehicle device 10, an instruction for setting the activity state to the rest state. Consequently, in step 408, the activity state is remotely set with respect to the on-vehicle device 10.

In step 409, the on-vehicle device 10 transmits, to the server 20, an activity event associated with the remote setting of the activity state. In this way, the terminal device 30 can perform the rest operation when the driver takes a rest. When the terminal device 30 has performed the rest operation, the activity state is set to the rest state, and the on-vehicle device 10 measures a rest time period.

As described above, in the vehicle operation management system 100, the terminal device 30 that can be brought outside the vehicle 1 can set the activity state of the vehicle 1 to the rest state. Therefore, even if the driver gets off the vehicle 1 before setting the activity state to the rest state, the activity state of the vehicle 1 can be set to the rest state using the terminal device 30. In this way, the activity state can be set to the rest state without the driver boarding the vehicle 1, and hence an inadvertent failure to set the activity state of the vehicle 1 can be prevented.

Furthermore, when the driver turns off the ignition switch of the vehicle 1 without changing the activity state of the vehicle 1 to the rest state, the on-vehicle device 10 transmits an electronic mail suggesting a change in the setting of the activity state to the terminal device 30 via the server 20. In this way, an inadvertent failure to set the activity state of the vehicle at the time of a rest can be prevented.

Once the terminal device 30 has transmitted the instruction for setting the activity state to the server 20 in step 406, a continuous driving time period of the vehicle 1 up until that point is transmitted to the terminal device 30 in step 410. In step 411, the terminal device 30 displays the continuous driving time period.

This enables the driver to check the continuous driving time period displayed on the terminal device 30 and acknowledge a necessary rest time period. Accordingly, the driver can take a rest at an appropriate time for a necessary time period. This facilitates safe driving.

Once the on-vehicle device 10 has transmitted the activity event to the server 20 in step 409, the server 20 transmits a fuel consumption rank, an eco-friendly score, and the like based on fuel consumption information pertaining to a vehicle operation up until that point to the terminal device 30 in step 412. Then, in step 413, the terminal device 30 displays the eco-friendly score history.

In this way, when the setting of the activity state has been changed, the terminal device 30 enables confirmation of the fuel consumption rank and the eco-friendly score of the vehicle 1. Accordingly, the driver can acknowledge the evaluation of his/her driving. This facilitates driving with low fuel consumption.

Next, the shutdown operation for setting the activity state of the vehicle 1 to the shutdown state will be described with reference to FIG. 5.

The processing in FIG. 5 is executed by the driver operating the terminal device 30 after getting off the vehicle 1, e.g., when a roll call is performed at the end of work in the office.

First, in step 501, the driver turns off the ignition switch of the vehicle 1. The processing of FIG. 5 is executed when the driver turns off the ignition switch with the activity state being left unchanged from the start state. That is to say, the processing of FIG. 5 is not executed when the driver turns off the ignition switch after setting the activity state to the shutdown state by operating the operation button 13 of the on-vehicle device 10.

In step 502, the on-vehicle device 10 transmits, to the server 20, a request suggesting the setting of the activity state. Then, in step 503, the server 20 issues a notification suggesting a change in the setting of the activity state to the terminal device 30. Specifically, the server 20 transmits, to the terminal device 30, an electronic mail suggesting a change in the setting of the activity state.

In this way, when the ignition switch of the vehicle 1 is turned off without performing an operation for changing the setting of the activity state, the on-vehicle device 10 issues a notification suggesting a change in the setting of the activity state to the terminal device 30 via the server 20.

In step 504, the driver checks the mail that was sent from the server 20 in step 503, and logs into the server 20 by operating the terminal device 30. Then, in step 505, the driver performs a remote shutdown operation by operating the terminal device 30.

In step 506, the terminal device 30 transmits an instruction for setting the activity state to the shutdown state to the server 20. Then, in step 507, the server 20 transmits an instruction for setting the activity state to the shutdown state to the on-vehicle device 10. Consequently, in step 508, the remote shutdown operation of the on-vehicle device 10 is performed.

In step 509, the on-vehicle device 10 transmits, to the server 20, an activity event associated with the remote shutdown operation. At this time, the on-vehicle device 10 transmits, to the server 20, driving data and location information of the vehicle 1 from the start to the shutdown. In this way, the terminal device 30 can perform the shutdown operation for ceasing the operation of the vehicle 1. When the terminal device 30 has performed the shutdown operation, the activity state is set to the shutdown state, and the on-vehicle device 10 ceases the collection of driving data of the vehicle 1.

As described above, in the vehicle operation management system 100, the terminal device 30 that can be brought outside the vehicle 1 can set the activity state of the vehicle 1 to the shutdown state. Therefore, even if the driver gets off the vehicle 1 before setting the activity state to the shutdown state, the activity state of the vehicle 1 can be set to the shutdown state using the terminal device 30. In this way, the activity state can be set to the shutdown state without the driver boarding the vehicle 1, and hence an inadvertent failure to set the activity state of the vehicle 1 can be prevented.

Furthermore, when the driver turns off the ignition switch of the vehicle 1 without changing the activity state of the vehicle 1 to the shutdown state, the on-vehicle device 10 transmits an electronic mail suggesting a change in the setting of the activity state to the terminal device 30 via the server 20. In this way, an inadvertent failure to set the activity state of the vehicle at the time of shutdown can be prevented.

Once the on-vehicle device 10 has transmitted the activity event to the server 20 in step 509, the server 20 transmits, to the terminal device 30, a fuel consumption rank, an eco-friendly score, and the like based on fuel consumption information from the start to the shutdown of that day in step 510. Then, in step 511, the terminal device 30 displays the eco-friendly score history. In this way, when the setting of the activity state has been changed, the terminal device 30 enables confirmation of the fuel consumption rank and the eco-friendly score of the vehicle 1. Accordingly, the driver can acknowledge the evaluation of his/her driving from the start to the shutdown of that day.

The foregoing embodiment achieves the following effects.

In the vehicle operation management system 100, the terminal device 30 that can be brought outside the vehicle 1 can set the activity state of the vehicle 1. Therefore, the driver can set the activity state of the vehicle 1 using the terminal device 30, even before boarding the vehicle 1 or after getting off the vehicle 1. In this way, the activity state can be set without the driver boarding the vehicle 1, and hence an inadvertent failure to set the activity state of the vehicle can be prevented.

Furthermore, when the driver turns off the ignition switch of the vehicle 1 without changing the activity state of the vehicle 1, the on-vehicle device 10 transmits an electronic mail suggesting a change in the setting of the activity state to the terminal device 30 via the server 20. In this way, an inadvertent failure to set the activity state of the vehicle at the time of a rest and shutdown can be prevented.

Embodiments of this invention were described above, but the above embodiments are merely examples of applications of this invention, and the technical scope of this invention is not limited to the specific constitutions of the above embodiments.

The embodiments of this invention in which an exclusive property or privilege is claimed are defined as follows:

1. A vehicle operation management system for managing an operation of a vehicle, the vehicle operation management system comprising:
   an on-vehicle device mounted on the vehicle, the on-vehicle device being configured to set one of a plurality of activity states of the vehicle by a driver of the vehicle;
   a terminal configured to be operated by the driver of the vehicle; and
   a server installed outside the vehicle, the server being configured to communicate with the on-vehicle device and the terminal;
   wherein the on-vehicle device includes:
   a digital tachograph configured to collect driving data of the vehicle and to store the driving data in an internal memory,
   a communication module configured to transmit the stored driving data to the server and to receive instructions from the server, and
   an operation button configured to be operated by the driver to select one of the plurality of activity states of the vehicle in order to set an activity state of the vehicle to the selected one of the plurality of activity states of the vehicle;
   wherein the plurality of activity states of the vehicle include: a start state defined when the operation of the vehicle is started, a shutdown state defined when the operation of the vehicle is ceased, and a rest state defined when the driver takes a rest;
   wherein the on-vehicle device is configured to start collecting the driving data of the vehicle when the vehicle is set to the start state;
   wherein the on-vehicle device is configured to cease collecting the driving data of the vehicle and the on-vehicle device is configured to transmit the driving data stored in the on-vehicle device to the server when the vehicle is set to the shutdown state;
   wherein the on-vehicle device is configured to measure a rest time period when the vehicle is set to the rest state;
   wherein the terminal is configured to send an operation signal to the on-vehicle device, via the server and the communication module, to set the activity states, due to the driver operating the terminal and entering an ID of the driver and a vehicle number into the terminal;
   wherein the on-vehicle device is configured to set the activity state according to the operation signal from the terminal;
   wherein upon determining that an ignition switch of the vehicle is turned off without performing an operation for changing a setting of the activity state, the on-vehicle device issues a notification to the terminal, via the server, that suggests a change in a setting of the activity state;
   wherein the server is configured to store fuel consumption information of the vehicle and to generate an eco-friendly score for evaluating a level of eco-friendly driving;
   wherein the on-vehicle device is configured to transmit the fuel consumption information to the server; and
   wherein when a setting of the activity state has changed, the fuel consumption information of the vehicle and the echo-friendly score are sent to the terminal.

2. The vehicle operation management system according to claim 1, wherein
   when the driver performs a shutdown operation with the terminal, an operation signal to shutdown is sent to the on-vehicle device via the server, and the activity state is set to the shutdown state.

3. The vehicle operation management system according to claim 1, wherein
when the driver performs a rest operation with the terminal, an operation signal to rest is sent to the on-vehicle device via the server, and the activity state is set to the rest state.

4. The vehicle operation management system according to claim 1, wherein
when the driver performs a start operation with the terminal, an operation signal to start is sent to the on-vehicle device via the server, and the activity state is set to the start state.

5. The vehicle operation management system according to claim 1, wherein the on-vehicle device further includes a global positioning system receiver.

6. The vehicle operation management system according to claim 5, wherein the on-vehicle device further includes a display unit.

7. The vehicle operation management system according to claim 1, wherein the fuel consumption information is transmitted from the on-vehicle device to the server when the vehicle is set to the shutdown state.

8. The vehicle operation management system according to claim 7, wherein the server stores the driving data and the fuel consumption information of the vehicle received from the on-vehicle device when the vehicle is set to the shutdown state.

* * * * *